United States Patent [19]

Hawley

[11] 4,394,291

[45] Jul. 19, 1983

[54] POLYOLEFIN POLYMERIZATION PROCESS AND CATALYST

[75] Inventor: Gil R. Hawley, Bartlesville, Okla.

[73] Assignee: Phillips Petroleum Company, Bartlesville, Okla.

[21] Appl. No.: 240,533

[22] Filed: Mar. 4, 1981

[51] Int. Cl.³ .............................................. C08F 4/64
[52] U.S. Cl. ........................... 252/429 B; 252/429 C; 526/119; 526/122; 526/125
[58] Field of Search ...................... 252/429 B, 429 C

[56] References Cited

U.S. PATENT DOCUMENTS

| | | | |
|---|---|---|---|
| 3,022,283 | 2/1962 | Wicklatz et al. | 260/93.7 |
| 3,150,122 | 9/1964 | Anderson et al. | 260/94.9 |
| 3,400,110 | 9/1968 | Dassesse et al. | 260/88.2 |
| 3,454,547 | 7/1969 | Delbouille et al. | 260/94.9 |
| 3,526,616 | 9/1970 | Delbouille et al. | 260/94.9 |
| 3,549,717 | 12/1970 | Itakura et al. | 252/429 B X |
| 3,642,746 | 2/1972 | Kashiwa et al. | 260/88.2 |
| 3,644,318 | 2/1972 | Diedrich et al. | 260/88.2 |
| 3,676,411 | 7/1972 | Throckmorton et al. | 252/429 B X |
| 3,676,418 | 7/1972 | Tashiro et al. | 260/88.2 |
| 3,726,845 | 4/1973 | Nickerson | 260/85.3 |
| 3,784,539 | 1/1974 | Ort | 252/429 C X |
| 3,901,863 | 8/1975 | Berger et al. | 260/88.2 |
| 3,953,414 | 4/1976 | Galli et al. | 526/348 |
| 4,039,472 | 8/1977 | Hoff | 252/429 C |
| 4,076,924 | 2/1978 | Toyota et al. | 526/125 |
| 4,107,412 | 8/1978 | Welch | 526/114 |
| 4,109,071 | 8/1978 | Berger et al. | 526/114 |
| 4,115,319 | 9/1978 | Scata et al. | 252/429 B |
| 4,130,503 | 12/1978 | Fodor | 252/429 B |
| 4,143,223 | 3/1979 | Toyota et al. | 526/125 |
| 4,167,493 | 9/1979 | Hsieh | 252/429 B |
| 4,218,339 | 8/1980 | Zucchini et al. | 252/429 B |
| 4,234,710 | 11/1980 | Moberly et al. | 526/125 |
| 4,242,480 | 12/1980 | Welch | 526/125 |
| 4,243,552 | 1/1981 | Welch et al. | 252/429 B |
| 4,294,948 | 10/1981 | Toyota et al. | 252/429 B X |

FOREIGN PATENT DOCUMENTS

| | | |
|---|---|---|
| 867400 | 11/1978 | Belgium . |
| 1077012 | 5/1980 | Canada . |
| 7425 | 2/1980 | European Pat. Off. . |
| 2300772 | 9/1976 | France . |
| 2311032 | 10/1976 | France . |
| 2382464 | 9/1978 | France . |
| 2392037 | 12/1978 | France . |
| 2331571 | 5/1980 | France . |
| 1271411 | 4/1972 | United Kingdom . |
| 1401708 | 7/1975 | United Kingdom . |
| 1490509 | 11/1977 | United Kingdom . |
| 1538472 | 1/1979 | United Kingdom . |
| 1539175 | 1/1979 | United Kingdom . |

Primary Examiner—Patrick Garvin

[57] ABSTRACT

A method for making novel catalysts for the polymerization of olefins, said catalysts being prepared by reacting a metal dihalide with certain transition metal compounds and reacting that product with certain organoaluminum compounds wherein in one embodiment that product is contacted with a halide exchanging source selected from halides of Groups IVA and VA of the Periodic Table and wherein in another embodiment a third component, such as an electron donor, is included in the reaction between the metal dihalide and the transition metal compound.

35 Claims, No Drawings

POLYOLEFIN POLYMERIZATION PROCESS AND CATALYST

The invention relates to the homo- or co-polymerization of alpha olefins. In another aspect, this invention relates to novel catalysts useful for the polymerization of alpha olefins.

In the production of polyolefins, such as for example polyethylene, polypropylene, ethylene-butene copolymers etc., an important aspects of the various processes and catalysts used to produce such polymers is the productivity. By productivity is meant the amount or yield of solid polymer that is obtained by employing a given quantity of catalyst. If the productivity is high enough then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from polymer is an expensive process and it is very desirable to employ a catalyst which provides sufficient productivity so that catalyst residue removal is not necessary.

In addition, high productivities are desirable in order to minimize catalyst costs. Therefore, it is desirable to develop new and improved catalysts and polymerization processes which provide improved polymer productivities.

An object of the present invention is to provide olefin polymerization catalysts that provide relatively high productivity and good selectivity to isotactic polymers of propylene and higher aliphatic 1-olefins.

Still yet another object of the present invention is to provide novel processes for the polymerization of olefins.

Another object is to provide a method for producing novel catalysts for the polymerization of olefins.

Other aspects, advantages, and features of the present invention will be apparent from the following disclosure.

SUMMARY

The present invention is directed to olefin polymerization using a product resulting when reactants comprising (a) a metal dihalide wherein the metal is selected from Groups IIA and IIB of the Periodic Table, and (b) a transition metal compound are (1) reacted to produce a first catalyst component, and then (2) that component is reacted with a second catalyst component comprising an organoaluminum precipitating agent.

In accordance with one embodiment of this invention, the catalyst component resulting from steps (1) and (2) is further reacted with a halide exchanging source comprising at least one halogen-containing compound of elements in Groups IVA and VA of the Periodic Table which are capable of adding halogen to the component resulting from steps (1) and (2).

In accordance with another embodiment of the present invention, titanium tetrachloride is employed in combination with the halogen-containing compounds mentioned in the preceding paragraph.

In accordance with yet another embodiment of the present invention, a third component, selected from electron donor compounds and substituted or non-substituted phenols, naphthols, and their sulfur-containing analogs, is included in the reaction of the metal dihalide and the transition metal compound in the preparation of the first catalyst component and that catalyst component is further reacted with at least one compound selected from the group consisting of the halogen-containing compounds of elements of Groups IVA and VA and the halides of titanium, vanadium, and zirconium.

In accordance with yet another embodiment, an electron donor is included with the halogen-containing components that are reacted with the catalyst component resulting from steps (1) and (2).

Another embodiment of the present invention concerns the employment of specific cocatalysts in combination with the inventive catalyst components.

In accordance with yet another embodiment of the present invention, a silicon tetrahydrocarbyloxide is employed along with a titanium tetrahydrocarbyloxide in the first step of preparing the catalyst.

The references made herein regarding Groups of the Periodic Table refer to the Periodic Table of the Elements as shown in the inside front cover of Perry, Chemical Engineer's Handbook, 4th Edition, MgGraw-Hill & Co. (1963).

DETAILED DESCRIPTION

Examples of Group IIA and IIB metal dihalides that can be used in forming the first component of the catalyst, include for example, the dihalides of beryllium, magnesium, calcium, and zinc. Dichlorides are preferred. Magnesium dichloride is preferred because it is readily available and relatively inexpensive and has provided excellent results.

The metal dihalide component is generally used in the form of an anhydrous, particulate solid to facilitate its reaction with the transition metal compound. It is also noted that various techniques for converting a metal halide compound to a fine particulate form, such as for example roll milling, reprecipitating, etc., can be used to prepare the metal halide compound for use according to the present invention and that such additional preparation of the metal halide compound promotes the reaction of the metal halide compound with the transition metal compound; however, it does not appear to make any difference in a catalyst of the present invention prepared from a composition of matter of the present invention if the metal halide compound is in a fine particulate form, that is, polymer productivity for example is not a function of the size of the particles of the metal halide compound.

The transition metal compounds comprise those wherein the transition metal is selected from the Groups IVB and VB and the transition metal is bonded to at least one atom selected from the group consisting of oxygen, nitrogen, and sulfur, and said oxygen nitrogen and sulfur atoms are in turn bonded to a carbon of a carbon-containing radical.

The transition metal is generally selected from titanium, zirconium, and vanadium although other transition metals can be employed. Excellent results have been obtained with titanium compounds and they are preferred. Some of the titanium compounds suitable for use in the invention include for example titanium tetrahydrocarbyloxides, titanium tetraimides, titanium tetraamides and titanium tetramercaptides. Other transition metal compounds include, for example, zirconium tetrahydrocarbyloxides, zirconium tetraimides, zirconium tetraamides, zirconium tetramercaptides, vanadium tetrahydrocabyloxides, vanadium tetraimides, vanadium tetraamides and vanadium tetramercaptides.

The titanium tetrahydrocarbyloxides are the preferred titanium compounds because they produce excellent results and are readily available. Suitable titanium tetrahydrocarbyloxide compounds include those expressed by the general formula ti Ti(OR)$_4$ wherein each R is individually selected from an alkyl, cycloalkyl, aryl, alkaryl, and aralkyl hydrocarbon radical containing from about 1 to about 20 carbon atoms per radical and each R can be the same or different. Titanium tetrahydocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium dimethoxidediethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide and titanium tetraphenoxide.

Of the titanium tetrahydrocarbyloxides, titanium tetraalkoxides are generally preferred and titanium tetra-n-butoxide is particularly preferred because of the excellent results obtained employing this material. Titanium tetra-n-butoxide is also generally available at a reasonable cost.

The molar ratio of the transition metal compound to the metal halide compounds can be selected over a relatively broad range. Generally the molar ratio is within the range of about 10:1 to about 1:10, however, the most common molar ratios are within the range of about 2:1 to about 1:2. When titanium tetrahydrocarbyloxide and magnesium dichloride are employed to form a composition of matter of the invention, a molar ratio of titanium to magnesium of about 1:2 is presently recommended as all the magnesium compound apparently goes into solution easily.

The metal halide compound and the transition metal compound employed in the present invention are normally mixed together by heating, e.g. refluxing, in a suitable dry (essential absence of water) solvent or diluent, which is essentially inert to these components and the product produced. By the term "inert" is meant that the solvent does not chemically react with the dissolved components such as to interfere with the formation of the product or the stability of the product once it is formed. Such solvents or diluents include, for example, n-pentane, n-heptane, methylcyclohexane, toluene, xylenes and the like. It is emphasized that aromatic solvents are preferred, such as for example xylene because the solubility of the metal halide compound and the transition metal compound is higher in aromatic solvents as compared to aliphatic solvents, particularly at low temperatures. Such mixing temperatures are generally within the range of from about 0° C. to about 50° C. and preferably from about 10° C. to about 30° C. Generally the amount of solvent or diluent employed can be selected over a broad range. Usually the amount of solvent or diluent is within the range of about 20 to about 100 cc per gram of metal dihalide. The temperature employed during the heating step can also be selected over a broad range. Normally the heating temperature is within the range of about 15° C. to about 150° C. when the heating step is carried out at atmospheric pressure. Obviously the heating temperatures employed could be higher if the pressure employed is above atmospheric pressure. The pressure employed during the heating step does not appear to be a significant parameter. In addition to the above noted solvents or diluents, more polar solvents or diluents such as nitrobenzene and halogenated hydrocarbons, e.g. methylene chloride, chlorobenzene and 1,2-dichloroethane can be used. Mixed solvents or diluents, such as for example, a mixture of n-hexane and tetrahydrofuran having a volume/volume ratio of, for example, about 50/50 can be employed in solubilizing hydrocarbon-soluble metal dihalides which are relatively difficult to solubilize, such as, for example, zinc dichloride and the like. Other suitable mixtures of two or more of the above solvents to solubilize the reagents of the first catalyst component can of course also be used and can be readily determined by one of ordinary skill in the art.

Generally, the time required for heating these two components together is within the range of about 5 minutes to about 10 hours, although in most instances a time within the range of about 15 minutes to about 3 hours is sufficient. Following the heating operation, the resulting solution can be filtered to remove any undissolved material or extraneous solid, if desired.

Suitable silicon tetrahydrocarbyloxides for use in the first step include those of the general formula Si(OR)$_4$ wherein each R is individually selected from an alkyl, cycloalkyl, aryl, alkaryl, and aralkyl hydrocarbon radical containing from about 1 to about 20 carbon atoms per radical and each R can be the same or different. Silicon tetrahydrocarbyloxides in which the hydrocarbyl group contains from about 1 to about 10 carbon atoms per radical are most often employed because they are more readily available.

The dihalides and the transition metal compounds, as above described, can be reacted in the presence of a liquid diluent or solvent or when at least one of the reagents is in the liquid state during the reaction the use of diluent can be omitted.

The organoaluminum precipitating agent is selected from compounds having the general formula AlR$_n$X$_{3-n}$ wherein each R is individually selected from saturated and unsaturated hydrocarbyl radicals containing 1 to 20 carbon atoms per radical, X is a halogen and n is any number such that $1 \leq n \leq 2$. Typical examples include methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-p-propylaluminum bromide, di-n-octylaluminum bromide, diphenylaluminum chloride, triethylaluminum, dicyclohexylaluminum bromide, dieicosylaluminum chloride, methylaluminum sesquibromide, ethylaluminum sesquichloride, ethylaluminum sesquiiodide, and the like, and mixtures thereof. Ethylaluminum sesquichloride, ethylaluminum dichloride, and diethylaluminum chloride have been employed with good results and are preferred. The most preferred organoaluminum halide compound is ethylaluminum sesquichloride, which produced the best results.

The reaction with the organoaluminum can also be carried out either in the presence of a liquid diluent or in the absence of such diluent, when at least one of the reagents is in the liquid state. Preferably, a liquid solution of the product of the reaction of the dihalide and the transition metal compound is contacted with a hydrocarbon solution of the aluminum halide.

The temperature emloyed while mixing the first and second catalyst components as above described can be selected over a broad range. Generally the temperature employed is within a range of about 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

In accordance with one embodiment of this invention, the catalyst component resulting from the reaction of the dihalide, the transition metal compound, and the organoaluminum compound is then reacted with a halide ion exchanging source comprising a halogen-containing compound of Groups IVA and VA capable of substituting a halogen atom for at least one —OR group in that catalyst component.

The particularly preferred halide ion exchanging compounds of Groups IVA and VA are chlorine-containing compounds of Si, Ge, Sn, P, and C. Typical examples include $COCl_2$, $PCl_3$, $SiCl_4$, $SnCl_4$, $CCl_4$, and acid chlorides of the formula R'COCl where R' is an aliphatic or aromatic radical, preferably containing 1 to 20 carbon atoms.

Other halogen-containing compounds suitable in this embodiment include chlorosiloxanes of the formula $Si_nO_{n-1}Cl_{2n+2}$ wherein n is a number in the range of 2 to 7, for example $Si_2OCl_6$; chlorinated polysilanes having the formula $Si_nCl_{2n+2}$ where n is a number in the range of 2 to 6, such as $Si_4Cl_{10}$; chlorinated silanes having the formula $SiH_{4-n}Cl_n$ wherein n is a number in the range of 1 to 3, such as $SiHCl_3$; silanes haing the formula $R'_nSiH_xCl_y$ wherein R' is an aromatic or aliphatic radical containing 1 to 20 carbon atoms, x is a number in the range of 0 to 2, and y is a number in the range of 1 to 3, such as $C_2H_5SiCl_3$, $CH_3SiCl_2H$, and $(CH_3)_2SiCl_2$; alkoxy-halogensilanes of the formula $Si(OR)_{4-n}Cl_n$ wherein R is an alkyl or aryl radical having 1 to 20 carbon atoms and n is a number in the range of 1 to 3, such as $Si(OC_2H_5)Cl_3$.

In a particularly preferred embodiment, a chlorine-containing silicon compound or an organosilane is employed in combination with $TiCl_4$. Examples of the more preferred silicon compounds for this embodiment include $SiCl_4$, $HSiCl_3$, $\phi SiHCl_2$ and $\phi_2SiCl_2$, wherein $\phi$ is a phenyl radical. In this embodiment, the ratio of silicon compound to $TiCl_4$ can vary considerably, generally however, best results are obtained if the molar ratio of silicon compound to $TiCl_4$ is in the range of about 1/1.

In yet another embodiment of the present invention, it has been found that very useful catalyst components result if a third component is included during the reaction of the dihalide compound and the transition metal compound, irrespective of whether the halogen exchanging source comprises only halogen compounds of Groups IVA and VA or only halides of titanium, vanadium, and zirconium or a combination thereof.

Evaluations have shown that many combinations of third components and specific transition metal compounds provide significant improvements in either productivity or selectivity for the more desirable insoluble polymer product.

Examples of compounds suitable for use as third components include electron donors such as ammonia, hydroxylamine, alcohols, ethers, carboxylic acids, esters, acid chlorides, amides, nitriles, amines, and substituted and unsubstituted phenols, naphthols and their sulfur-containing analogs, i.e. thiophenols. The preferred compounds are aromatic compounds selected from the group consisting of phenols, thiophenols, naphthols, aralkyl alcohols, aromatic acids, and aromatic esters.

The mole ratio of third component compound employed in step (1) relative to the transition metal compound can vary from about 5:1 to about 1:5, preferably about 1:1 to 2:1.

In accordance with an especially preferred embodiment a phenol and an aromatic ester are employed in the reaction between the transition metal compound and the dihalide compound.

Generally the reaction of the product from step (2) with the halide ion exchanging source can be carried out neat or in a liquid medium in which the halide ion exchanging source is soluble. Accordingly, the product from step (2) is generally contacted with a liquid diluent in the process containing the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of −25° C. to +250° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a relatively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously discussed, n-hexane, or xylene for example. The resulting catalyst, after drying, is stored under dry nitrogen.

If desired, the catalyst can be admixed with a particulate diluent such as, for example, silica, silica-alumina, silica-titania, magnesium dichloride, magnesium oxide, polyethylene, polypropylene, and poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent has been found effective to facilitate charging of the catalyst to the reactor.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II, and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, triecosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

Generally it has also been found desirable to include an electron donor, i.e. Lewis bases, with various kinds with triakyl aluminum cocatalyst. Among Lewis bases capable of appropriate addition and/or substitution are amines, amides, ethers, esters, ketones, nitriles, phosphines, stibines, arsines, phosphoramides, thioethers, aldehydes, alcoholates, amides and salts of organic acids of metals of the first four groups of the Periodic Table. The most interesting results, as regards both activity and stereospecificity, have been obtained using an ester or a diamine. Typical examples of such compounds are ethyl benzoate, ethyl p-methoxybenzoate, diethyl carbonate, ethyl acetate, dimethyl maleate, triethyl borate, ethyl o-chlorobenzoate, ethyl naphthenate, ethyl toluate, ethyl p-butoxybenzoate, ethyl cyclohexanoate, ethyl pivalate, N,N,N',N'-tetramethylenediamine, 1,2,4-trimethylpiperazine, and 2,5-dimethylpiperazine. The preferred Lewis base:aluminum alkyl ratio is lower than 0.8:1, in the case of an ester or diamine, it is from 0.1:1 to 0.6:1. Generally, the catalyst activity and stereospecifity are related to the Lewis base:aluminum alkyl molar ratio.

In yet another embodiment of the present invention when a cocatalyst comprising triethylaluminum and ethyl anisate is employed, it has been found desirable to include diphenylacetylene in the cocatalyst to provide even lower amounts of soluble polymer. The amount of diphenylacetylene can range from about 0.1 to about 1.5 moles per mole of organoaluminum cocatalyst present.

If an electron donor is included with the halogen-exchanging source in step (3) of the catalyst preparation, it has generally been found to have adverse effects upon either selectivity and/or productivity. These adverse effects can be countered to some extent by reacting the product with yet still more halogen-exchanging source.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins, Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include for example styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence of absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene. Preferably also then the molar ratio of trialkylaluminum to electron donor in the cocatalyst is about 2:1.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples illustrating a few embodiments of the invention.

EXAMPLE I

A series of catalysts were prepared using different titanium tetrahydrocarbyloxides with or without phenols or substituted phenols. The preparations employing the phenols can be summarized by the following equations:

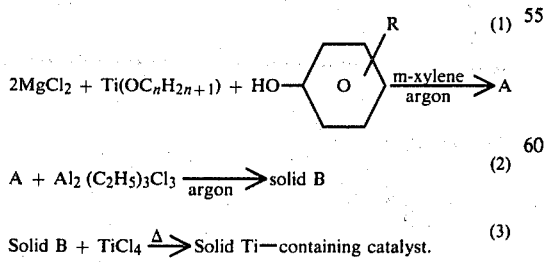

$$2MgCl_2 + Ti(OC_nH_{2n+1}) + HO-\langle O \rangle-R \xrightarrow[\text{argon}]{\text{m-xylene}} A \quad (1)$$

$$A + Al_2(C_2H_5)_3Cl_3 \xrightarrow{\text{argon}} \text{solid B} \quad (2)$$

$$\text{Solid B} + TiCl_4 \xrightarrow{\Delta} \text{Solid Ti—containing catalyst.} \quad (3)$$

The conditions and amounts of reactants employed in run 5 are typical for this series. Under argon in a dry box were mixed 0.04 mole (3.81 g) of anhydrous magnesium chloride, 0.02 mole (7.16 g) of titanium tetra-n-butoxide, 0.02 mole (1.88 g) of phenol and 10 mL of n-xylene in a 10 oz (295 mL) beverage bottle. The bottle was capped, removed from the dry box and it was heated for one hour at 100° C. in an oil bath while stirring the contents resulting in a mixture comprising a solution containing a small amount of undissolved material. The bottle and contents were cooled to about room temperature (23° C.) and diluted with about 25 mL of m-xylene. While stirring the mixture, 25 mL of a 25 percent solution of ethylaluminum sesquichloride (EASC) in n-heptane (0.02 mole) was added dropwise over about a 15 minute period of time to yield a precipitate. The bottle was returned to the dry box where the precipitate was filtered off and washed by diluting it with 50 mL of m-xylene, centrifuging the mixture and decanting the dark red liquid. The solid was reslurried in 100 mL of n-hexane, centrifuging and decanting as before and repeating the n-hexane treatment one more time. The solid was recovered, dried and weighed to obtain 6.46 g of a yellow solid.

The yellow solid was slurried in 25 mL (0.23 mole, 43.2 g) of titanium tetrachloride in a capped beverage bottle while in the dry box. The bottle was removed, heated for one hour with stirring at 100° C. in an oil bath, cooled to room temperature, and returned to the dry box. The slurry was filtered to isolate the product which was repeatedly washed with n-hexane until the initially red filtrate became colorless. The cake was dried overnight under an argon stream to yield 4.85 g of an orange solid as the catalyst.

The solid Ti-containing catalysts were then employed in the polymerization of propylene using 2.2 mmoles (2.2 mL) triethylaluminum as a cocatalyst as a one molar solution in n-heptane.

The polymerizations were run at 70° C. for one hour in liquid propylene with 10 psi hydrogen in a one liter reactor.

TABLE I

| Run No. | $n^{(1)}$ | $R^{(2)}$ | Cat. Mg | Productivity$^{(3)}$ | Total Solubles$^{(4)}$ |
|---|---|---|---|---|---|
| 1 | 2 | — | 9.1 | 15.0 | 41 |
| 2 | 4 | — | 3.7 | 19.5 | 42 |
| 3 | 6 | — | 23.2 | 13.9 | 37 |
| 4 | 2 | H | 4.7 | 13.7 | 45 |
| 5 | 4 | H | 4.8 | 51.9 | 27 |
| 6 | 6 | H | 9.0 | 25.1 | 31 |
| 7 | 8 | H | 1.2 | 16.1 | 30 |
| 8 | 2 | o-CH$_3$ | 3.3 | 20.2 | 37 |
| 9 | 4 | o-CH$_3$ | 5.0 | 43.5 | 27 |
| 10 | 6 | o-CH$_3$ | 9.8 | 19.2 | 31 |
| 11 | 8 | o-CH$_3$ | 7.4 | 21.3 | 31 |
| 12 | 2 | m-CH$_3$ | 2.8 | 14.6 | 41 |
| 13 | 4 | m-CH$_3$ | 9.8 | 25.3 | 30 |
| 14 | 6 | m-CH$_3$ | 7.6 | 35.8 | 31 |
| 15 | 8 | m-CH$_3$ | 8.4 | 32.6 | 31 |
| 16 | 2 | p-CH$_3$ | 1.3 | 5.9 | nd$^{(5)}$ |
| 17 | 4 | p-CH$_3$ | 3.4 | 36.4 | 28 |
| 18 | 6 | p-CH$_3$ | 7.0 | 31.2 | 23 |
| 19 | 8 | p-CH$_3$ | 8.7 | 21.9 | 29 |
| 20 | 4 | p-OCH$_3$ | 4.1 | 33.2 | 26 |
| 21 | 4 | 3-t-Bu | 6.5 | 35.0 | 31 |
| 22 | 4 | 3-F | 5.3 | 43.6 | 25 |

TABLE I-continued

| Run No. | n[1] | R[2] | Cat. Mg | Productivity[3] | Total Solubles[4] |
|---|---|---|---|---|---|
| 23 | 4 | 4-F | 7.7 | 37.8 | 25 |

[1] n of Ti(OC$_n$H$_{2n+1}$) of equation 1 above.

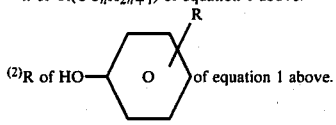

[2] R of HO—⟨O⟩ of equation 1 above.

(A dash indicates no phenol used.)
[3] Kilograms of polymer/gram of catalyst/hour.
[4] Xylene solubles.
[5] nd is not determined.

These data show that the employment of phenols during the preparation of the titanium-containing catalyst generally results in improved productivity and lowered solubles. The improvements in productivity are particularly noteable, often being 50 to 100 percent greater than that obtained without the phenol. A series of runs with similar catalysts revealed that while the control catalysts became less active after about one-half hour, the polymerization rate with the inventive catalysts remains high even after 1 or 2 hours of reaction.

EXAMPLE II

Another series of catalysts were prepared using titanium tetrabutoxide with or without thiophenol or substituted thiophenols. The catalysts were prepared in the same manner as described in Example I except thiophenols rather than phenols were employed. The resulting Ti-containing catalysts were then employed with 2.2 mmoles of triethylaluminum cocatalyst and 10 psi hydrogen as before to polymerize propylene as described in Example I. The results are summarized in Table II.

TABLE II

| Run No. | R[1] | Cat. Mg | Productivity[2] | Total Solubles[3] |
|---|---|---|---|---|
| 2 | — | 3.7 | 19.5 | 42 |
| 24 | p-OCH$_3$ | 2.8 | 18.8 | 29 |
| 25 | p-CH$_3$ | 4.0 | 31.7 | 29 |
| 26 | p-Cl | 6.1 | 23.1 | 35 |
| 27 | F$_5$ | 8.3 | 11.4 | 34 |
| 28 | p-F | 7.0 | 10.8 | 36 |
| 29 | H | 5.1 | 25.8 | 34 |

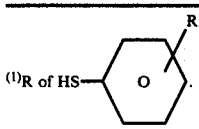

[1] R of HS—⟨O⟩.

(A dash indicates no thiophenol employed.)
[2] As in Table I.

These results show that thiophenols in general reduce the solubles and often also increase the productivity.

EXAMPLE III

Another series of catalysts were prepared and used in polymerizing propylene as in Example II, however, here the thiophenols were replaced by naphthols. The results are summarized in Table III.

TABLE III

| Run No. | Naphthol | Cat. Mg | Productivity[1] | Total Solubles[2] |
|---|---|---|---|---|
| 2 | None | 3.7 | 19.5 | 42 |
| 30 | 1-naphthol | 7.1 | 14.8 | 32 |
| 31 | 2-naphthol | 14.5 | 23.0 | 32 |
| 33 | 4-methoxy- | 4.3 | 7.1 | 23 |

[1] As in Table I.

These results show that the naphthols reduced the solubles level. Productivity was also improved with 2-naphthol. The catalyst prepared with 4-methoxy-1-naphthol had a much greater response to the hydrogen than did the other two inventive catalysts, as demonstrated by the fact that the melt flow at 230° C. for its polymer was about 747 whereas the melt flow of the polymers of runs 30 and 31 was 87 and 13, respectively.

EXAMPLE IV

Still another series of catalysts were prepared and used in polymerizing propylene as in Example II, however, here the thiophenols were replaced by benzoic acids. The results are summarized in Table IV.

TABLE IV

| Run No. | R[1] | Cat. Mg | Productivity[2] | Total Solubles[2] |
|---|---|---|---|---|
| 2 | — | 3.7 | 19.5 | 42 |
| 34 | o-OCH$_3$ | 4.6 | 2.7 | 52 |
| 35 | m-OCH$_3$ | 6.4 | 17.1 | 32 |
| 36 | p-OCH$_3$ | 7.1 | 21.7 | 27 |
| 37 | H | 5.3 | 27.8 | 29 |

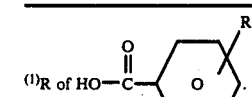

[1] R of HO—C(=O)—⟨O⟩.

(The dash indicates no acid employed.)
[2] As in Table I.

With the exception of o-methoxy-benzoic acid, all the runs gave lowered solubles. In terms of improved overall characteristics, the catalyst of runs 36 and 37 were best.

EXAMPLE V

In yet another series of experiments, catalysts were prepared and used to polymerize propylene as in Example II where benzyl alcohols were employed in place of the thiophenols. The results are summarized in Table V.

TABLE V

| Run No. | R[1] | Productivity[2] | Total Solubles[2] |
|---|---|---|---|
| 2 | — | 19.5 | 42 |
| 38 | o-OCH$_3$ | 5.8 | 33 |
| 39 | m-OCH$_3$ | 9.8 | 37 |
| 40 | p-OCH$_3$ | 23.1 | 34 |
| 41 | H | 34.8 | 33 |

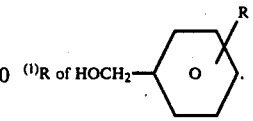

[1] R of HOCH$_2$—⟨O⟩.

(A dash indicates no alcohol employed.)
[2] As in Table I.

All the benzyl alcohols produced a reduction in solubles. Unsubstituted benzyl alcohol and p-methoxy-benzyl alcohol produced the most desirable effects since they also provided improved productivity.

EXAMPLE VI

Another series of catalysts was made employing titanium tetrabutyloxide and phenol in the reaction set forth in equation 1 of Example I. The second step of the catalyst preparation was the same as that set forth in Equation 2 of Example I. In the third step, the titanium tetrachloride was replaced with another halogenating agent.

In this series of catalyst preparations, the identical procedure described in Example 1, run 5 was followed up to the point where the titanium tetrachloride contacting step was employed. In place of the $TiCl_4$ used in run 5, the specified halogenating liquid compound of this example was employed to slurry the yellow solid. Each mixture was heated for one hour at 100° C., cooled and the catalyst isolated as before.

For the catalyst used in run 42, 6.46 g of yellow solid was treated with 25 mL (0.21 mole) of $SnCl_4$. An orange solid weighing 5.09 g was recovered as the catalyst.

For the catalyst used in run 43, 6.41 g of yellow solid was treated with 25 mL (0.21 mole) of $SiCl_4$. A pinkish-orange solid weighing 4.09 g was recovered as the catalyst.

For the catalyst used in run 44, 6.43 g of yellow solid was treated with 25 mL (0.26 mole) of $CCl_4$. A yellow solid weighing 4.67 g was recovered as the catalyst.

For the catalyst used in run 45, 6.35 g of yellow solid was treated with 25 mL (0.29 mole) of $PCl_3$. An orange-yellow solid weighing 4.50 g was recovered as the catalyst.

These catalysts were then employed in combination with a cocatalyst of 2.2 mmoles triethylaluminum and 10 psi hydrogen as before. The polymerization conditions were as set forth in Example I. The results obtained are summarized in Table VI.

TABLE VI

| Run No. | Halogenating Agent | Cat. Mg | Productivity[1] | Total Solubles[1] |
|---|---|---|---|---|
| 5 | $TiCl_4$ | 4.8 | 51.9 | 27 |
| 42 | $SnCl_4$ | 13.7 | 6.9 | 34 |
| 43 | $SiCl_4$ | 7.3 | 20.2 | 34.5 |
| 44 | $CCl_4$ | 6.6 | 7.0 | 40.0 |
| 45 | $PCl_3$ | 4.3 | 2.92 | 42.9 |

[1]As in Table I.

While the $TiCl_4$ produces the most desirable catalyst, the other halogenating agents did yield catalysts that could be used to produce polypropylene.

EXAMPLE VII

In another set of preparations $SiCl_4$ or $SnCl_4$ was employed along with $TiCl_4$ in the third step of the catalyst preparation scheme. The first two steps were as used in Example VI. The third step can be illustrated as follows:

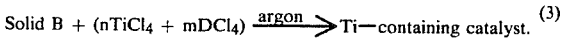

$$\text{Solid B} + (nTiCl_4 + mDCl_4) \xrightarrow{\text{argon}} \text{Ti—containing catalyst.} \quad (3)$$

wherein n and m indicate the molar ratio of $TiCl_4$ and $DCl_4$ and D is Si or Sn. These catalysts were combined with a complex of triethylaluminum (TEA) and ethylanisate (EA) and then used with a further cocatalyst consisting of diethylaluminum chloride (DEAC) to polymerize propylene.

The reactor was charged in order with the 2:1 molar complex of TEA.EA cocatalyst, catalyst, additional cocatalyst of diethylaluminum chloride (DEAC), 10 psi hydrogen and liquid propylene. The entire cocatalyst consisted of 2.2 mmoles of TEA, 1.1 mmoles of EA and 2.2 mmoles of DEAC. Polymerization was conducted for one hour (unless specified otherwise) at 70° C.

The results are summarized in Table VII.

TABLE VII

| Run No. | n | m | D | Cat. Mg | Productivity[1] | Total Solubles[1] |
|---|---|---|---|---|---|---|
| 46 | 1 | 0 | — | 9.2 | 7.6 | 8.3 |
| 47 | 0 | 1 | Si | 3.3 | 4.8[2] | 18.2 |
| 48 | .25 | .75 | Si | 9.7 | 12.9 | 6.3 |
| 49 | .5 | .5 | Si | 12.6 | 13.9 | 5.2 |
| 50 | .75 | .25 | Si | 11.4 | 11.6 | 8.0 |
| 51 | .5 | .5 | Sn | 9.0 | 6.5 | 11.7 |
| 52 | .75 | .25 | Sn | 8.3 | 5.0 | 10.7 |

[1]As in Table I.
[2]Kilograms polymer per g catalyst per 1.66 hours.

The data shows that the results obtained by using a combination of $TiCl_4$ and $SiCl_4$ are significantly better than when either of those halogenating agents is used alone. The 50/50 mixture of $TiCl_4$ and $SiCl_4$ was the best catalyst since it produced the highest productivity and the lowest solubles. Although the catalysts prepared using a combination of $SnCl_4$ and $TiCl_4$ were somewhat inferior to those prepared using $TiCl_4$ above, such catalysts could be used to make polypropylene.

It was further observed that the polymerization rate obtained with the inventive catalysts did not decrease nearly as rapidly as catalysts of the type illustrated by Run No. 2 of Table I, i.e. those not containing a phenol.

EXAMPLE VIII

Another series of catalysts were prepared to evaluate the effect of various substituents on phenols of a catalyst prepared using a 50/50 molar ratio of $SiCl_4$ and $TiCl_4$. The preparation was otherwise as described in Example VII.

The catalysts employed in runs 53 and 60–69 were prepared up to the $TiCl_4$ treatment as described in Example I. The catalysts used in runs 54–59 were prepared as the others above except that only 0.02 mole $MgCl_2$, 0.01 mole titanium tetra-butoxide, and 0.01 mole of the specific phenolic compound was used. The same quantity of EASC (0.02 mole) was employed in each preparation.

Each product thus made was then contacted for one hour at 100° C. with a 1:1 molar mixture of $SiCl_4$ and $TiCl_4$. Recovery, purification and drying was carried out as before. The catalyst used in run 53 was contacted with 20 mL of the $SiCl_4$-$TiCl_4$ mixture (about 0.09 mole of each component) whereas each remaining catalyst was contacted with 25 mL of the mixture (0.1 mole of each component).

These catalysts were used to polymerize liquid propylene in the presence of a cocatalyst comprising $2Al(C_2H_5)_3$.ethylanisate and diethylaluminum chloride (2.2 mmoles TEA; 1.1 mmoles EA; 2.2 mmoles of DEAC). Charge order and polymerization conditions were as in Example VII.

The results are summarized in Table VIII.

TABLE VIII

| Run No. | Substituent | Cat. Mg | Productivity[1] | Total Solubles[1] |
|---|---|---|---|---|
| 53 | None | 12.6 | 13.9 | 5.2 |
| 54 | o-F | 5.1 | 6.1 | 8.7 |

TABLE VIII-continued

| Run No. | Substituent | Cat. Mg | Productivity[1] | Total Solubles[1] |
|---|---|---|---|---|
| 55 | m-F | 5.6 | 5.8 | 12.0 |
| 56 | p-F | 7.3 | 7.6 | 4.5 |
| 57 | o-CH$_3$ | 7.4 | 5.7 | 7.1 |
| 58 | m-CH$_3$ | 7.1 | 6.3 | 7.3 |
| 59 | p-CH$_3$ | 8.7 | 7.4 | 4.2 |
| 60 | p-sec-Bu | 13.2 | 6.5 | 3.5 |
| 61 | p-C$_2$H$_5$ | 7.2 | 9.5 | 4.5 |
| 62 | p-isopropyl | 12.7 | 5.7 | 4.3 |
| 63 | p-phenyl | 6.8 | 8.8 | 3.7 |
| 64 | p-t-Bu | 8.2 | 5.5 | 5.0 |
| 65 | p-OCH$_3$ | 5.7 | 9.4 | 4.2 |
| 66 | p-C≡N | 15.6 | 0.2 | 36.4 |
| 67 | p-NO$_2$ | 21.1 | 0.5 | 18.3 |
| 68 | p-CHO | 17.4 | 0.6 | 19.3 |
| 69 | p-C(O)CH$_3$ | 25.1 | 0.4 | 33.0 |

[1]As in Table I.

These results show that phenols having substituents having negative or low σ-Hammett values produce better catalysts than those having substituents having high σ-Hammett values such as those shown in runs 66–69. Catalysts produced with unsubstituted phenol (run 53) or para-substituted phenols (runs 56, 59–65) are very active with this cocatalyst system, yielding crystalline polymers having low soluble levels, i.e. about 3 to 5 weight percent.

EXAMPLE IX

In these runs thiophenols were used in step 1 of the catalyst preparation and a 50:50 molar mixture of SiCl$_4$ and TiCl$_4$, 0.1 mole of each, was used in the third step of the catalyst preparation. The preparations were otherwise as described in Example VII.

These catalysts were then used to polymerize liquid propylene using as cocatalyst (1) 2.2 mmoles triethylaluminum, i.e. TEA or (2) 2.2 mmoles TEA, 1.1 mmoles ethylanisate +2 mmoles 2AlCl(C$_2$H$_5$)$_3$.

The results are summarized in Table IX.

TABLE IX

| Run No. | R[1] | Cocat[2] | Cat. Mg | Productivity[3] | Total Solubles[3] |
|---|---|---|---|---|---|
| 70 | p-OCH$_3$ | 1 | 10.6 | 22.8 | 30.9 |
| 71 | p-CH$_3$ | 1 | 14.1 | 24.8 | 32.6 |
| 72 | p-Cl | 1 | 8.9 | 25.1 | 32.3 |
| 73 | p-F | 1 | 7.3 | 28.0 | 29.3 |
| 74 | H | 1 | 8.2 | 27.6 | 35.7 |
| 75 | p-OCH$_3$ | 2 | 5.4 | 5.0 | 10.5 |
| 76 | p-CH$_3$ | 2 | 7.9 | 9.8 | 7.3 |
| 77 | p-Cl | 2 | 7.3 | 9.4 | 8.3 |
| 78 | p-F | 2 | 7.5 | 6.0 | 9.0 |
| 79 | H | 2 | 9.3 | 4.8 | 7.5 |

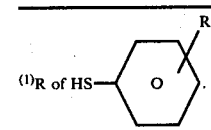

[1]R of HS—⟨aryl⟩
[2](1) is TEA; (2) is 2Al(C$_2$H$_5$)$_3$·ethylanisate + 2AlCl(C$_2$H$_5$)$_2$.
[3]As in Table I.

A comparison of Runs 70–74 with the runs of Table II demonstrates that the use of a combination of SiCl$_4$ and TiCl$_4$ produces a more active catalyst than using TiCl$_4$ alone. The data further illustrate that thiophenols in general are useful as third component compounds for use in preparing the titanium-containing component of the catalyst. The results also demonstrate the effect of cocatalyst selection upon productivity and soluble polymer formation.

EXAMPLE X

Another series of runs were made in which the catalyst was prepared as in Example IX except that a benzyl alcohol was substituted for the thiophenol. The results are summarized in Table X.

TABLE X

| Run No. | R[1] | Cocat[2] | Cat. Mg | Productivity[3] | Total Solubles[3] |
|---|---|---|---|---|---|
| 80 | p-OCH$_3$ | 1 | 6.0 | 34.8 | 30.7 |
| 81 | H | 1 | 10.5 | 27.9 | 27.1 |
| 82 | p-OCH$_3$ | 2 | 9.1 | 3.2 | 5.7 |
| 83 | H | 2 | 13.9 | 5.7 | 5.1 |

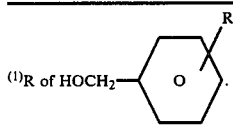

[1]R of HOCH$_2$—⟨aryl⟩.
[2]As in Table IX.
[3]As in Table I.

This illustrates that high activity catalysts can be obtained using benzyl alcohols and a TiCl$_4$:SiCl$_4$ combination and again show effect of cocatalyst selection upon productivity and soluble polymer formation.

EXAMPLE XI

In this series of runs benzoic acids were used in the place of the thiophenols of Example IX. The results are summarized in Table XI.

TABLE XI

| Run No. | R[1] | Cocat[2] | Cat. Mg | Productivity[3] | Total Solubles[3] |
|---|---|---|---|---|---|
| 84 | p-OCH$_3$ | 1 | 7.0 | 24.3 | 33.1 |
| 85 | H | 1 | 7.4 | 27.1 | 28.2 |
| 86 | p-OCH$_3$ | 2 | 9.1 | 3.1 | 9.4 |
| 87 | H | 2 | 10.4 | 3.6 | 5.5 |

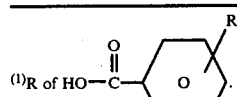

[1]R of HO—C(O)—⟨aryl⟩.
[2](1) TEA; (2) 2Al(C$_2$H$_5$)$_3$·ethylanisate + 2AlCl(C$_2$H$_5$)$_2$.
[3]As in Table I.

This illustrates that high activity catalysts can be obtained using benzoic acids and a TiCl$_4$:SiCl$_4$ combination.

EXAMPLE XII

In another set of catalyst preparation, a chlorinated silane, viz. HSiCl$_3$, was employed with TiCl$_4$ as a 1:1 molar mixture (about 0.09 mole of each) in the third step. The first two steps were as used in Example VI using the same quantities of reagents. Various phenols were employed.

The catalysts were evaluated for the polymerization of liquid propylene using a cocatalyst comprising 2Al(C$_2$H$_5$)$_3$·ethylanisate + 2Al(C$_2$H$_5$)$_2$Cl. The results are summarized in Table XII.

TABLE XII

| Run No. | R[1] | Cat. Mg | Productivity[2] | Total Solubles[2] |
|---|---|---|---|---|
| 88 | —C$_2$H$_5$ | 5.3 | 21.6 | 9.3 |
| 89 | —i-propyl | 8.0 | 13.1 | 4.8 |

TABLE XII-continued

| Run No. | R[1] | Cat. Mg | Productivity[2] | Total Solubles[2] |
|---|---|---|---|---|
| 90 | sec-butyl | 4.8 | 13.9 | 8.3 |
| 91 | t-butyl | 4.8 | 11.3 | 6.0 |
| 92 | phenyl | 7.9 | 8.6 | n.d. |
| 93 | —OCH$_3$ | 4.3 | 13.03 | n.d. |

[1] R of HO— 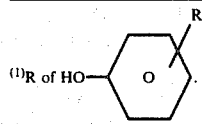

[2] As in Table I.

This data demonstrates that high yield catalysts can be obtained by employing HSiCl$_3$ in combination with TiCl$_4$. A comparison of this data with that in Table VIII indicates that HSiCl$_3$ results in even more productive catalysts than SiCl$_4$.

EXAMPLE XIII

In another series of catalyst preparations various organosilanes were employed with TiCl$_4$ as 1:1 molar ratios (0.09 mole of each) in the third step. The first two steps were as in Example VI.

The catalysts were evaluated for the polymerization of liquid propylene using as cocatalyst 2.2 mmoles TEA, 1.1 mmoles EA, 2.2 mmoles DEAC.

The results are summarized in Table XIII.

TABLE XIII

| Run No.[1] | Silane[2] | Cat. Mg | Productivity[3] | Total Solubles[3] |
|---|---|---|---|---|
| 94 | Me—φ-SiCl$_3$ | 12.3 | 2.6 | 8.0 |
| 95 | φSiCl$_3$ | 9.8 | 4.7 | 11.6 |
| 96 | φ$_2$SiCl$_2$ | 6.0 | 7.0 | 9.7 |
| 97 | φ$_3$SiCl | 5.9 | 8.2 | 16.9 |
| 98 | φ$_2$SiHCl | 7.7 | 19.5 | 16.7 |
| 99 | φSiHCl$_2$ | 5.9 | 19.9 | 8.0 |
| 100 | φ$_2$SiHMe | 7.0 | 9.9 | 17.0 |
| 101 | φSiH$_3$ | 9.5 | 3.5 | 23.8 |
| 102 | φ$_3$SiH | 4.7 | 8.8 | 15.4 |
| 103 | φ$_2$SiH$_2$ | 8.9 | 3.6 | 24.0 |
| 104 | φSiHMe$_2$ | 4.7 | 11.3 | 12.6 |
| 105 | φSiH$_2$Me | 13.3 | 5.1 | 20.3 |
| 106 | φSiMeHCl | 4.0 | 12.5 | 18.6 |
| 107 | Me$_2$SiHCl | 6.2 | 15.8 | 7.1 |
| 108 | MeSiHCl$_2$ | 5.6 | 13.6 | 6.3 |
| 109 | Et$_3$SiH | 5.0 | 10.5 | 18.0 |
| 110 | HSiCl$_3$ | 4.6 | 18.8 | 4.6 |

[1] Polymerizations carried out in liquid propylene in presence of hydrogen. Run 88 for 2.5 hours, all others 1 hour.
[2] Me = methyl, φ = phenyl, Et = ethyl.
[3] As in Table I.

The most active silanes were φSiHCl, φSiHCl$_2$, HSiCl$_3$, Me$_2$SiHCl, MeSiHCl$_2$, φSiMeHCl, φSiMeH$_2$, and Et$_3$SiH.

EXAMPLE XIV

In another series of polymerizations, catalyst systems were employed in which the titanium containing components were prepared as described in the preceding example, i.e. with various silanes in combination with TiCl$_4$ as 1:1 molar ratio mixtures containing 0.09 mole of each component.

Those catalysts were evaluated for the polymerization of liquid propylene using a cocatalyst of 2 mmoles of triethylaluminum combined with about 1.0 mmole of an electron donor other than ethylanisate and 2 mmoles of diethylaluminum chloride. The results are summarized in Table XIV wherein the electron donors are denoted by the following formulas φ$_3$P=O is triphenylphosphine oxide
φ$_2$PH is diphenylphosphine
φ$_2$C$_2$ is diphenylacetylene
DMF is n,n-dimethylformamide
NHφ$_2$ is diphenylamine
NH(Et)$_2$ is diethylamine
N(Et)$_3$ is triethylamine
NH(C$_8$H$_{17}$)$_2$ is di-n-octylamine.

TABLE XIV

| Run No. | Silane | Electron Donor | Cat. Mg | Productivity[1] | Total Solubles[1] |
|---|---|---|---|---|---|
| 111 | Me$_2$SiHCl | φ$_3$P=O | 6.8 | 16.5 | 13.9 |
| 112 | MeSiHCl$_2$ | φ$_3$P=O | 4.8 | 16.0 | 17.2 |
| 113 | Me$_2$SiHCl | φ$_2$PH | 4.8 | 20.0 | 15.2 |
| 114 | MeSiHCl$_2$ | φ$_2$PH | 2.9 | 17.2 | 12.0 |
| 115 | φSiMeHCl | φ$_2$PH | 3.8 | 16.5 | 14.6 |
| 116 | φ$_2$SiHCl | φ$_2$PH | 4.0 | 19.7 | 18.0 |
| 117 | HSiCl$_3$ | φ$_2$PH | 2.8 | 19.8 | 8.5 |
| 118 | HSiCl$_3$ | φ$_2$C$_2$ | 2.5 | 24.5 | 14.7 |
| 119 | Me$_2$SiHCl | φ$_2$C$_2$ | 7.1 | 22.6 | 18.3 |
| 120 | MeSiHCl | φ$_2$C$_2$ | 4.1 | 19.1 | 16.3 |
| 121[a] | HSiCl$_3$ | DMF | 3.5 | 25.9 | 19.2 |
| 122 | HSiCl$_3$ | Pyrazine | 3.6 | 37.9 | 17.0 |
| 123 | HSiCl$_3$ | NHφ$_2$ | 3.3 | 21.9 | 19.6 |
| 124 | HSiCl$_3$ | NH(Et)$_2$ | 3.7 | 29.5 | 17.2 |
| 125 | HSiCl$_3$ | N(Et)$_3$ | 4.2 | 26.81 | 18.2 |
| 126 | HSiCl$_3$ | NH(C$_8$H$_{17}$)$_2$ | 5.3 | 28.7 | 21.0 |

[1] As in Table I.
[a] The catalyst of Runs 116–121 was prepared with only half of the phenol that was used in preparing the others.

These results show that various electron donors can be used to replace esters such as ethylanisate in the cocatalyst system.

EXAMPLE XV

In this series of polymerizations, half of the titanium tetraalkoxide used in the first step of the catalyst preparation is replaced by silicon tetraalkoxide. Steps (2) and (3) of the catalyst preparation are as set forth in Example I. Various phenols were also employed in the first step.

These catalysts were used to polymerize liquid propylene at 70° C. in the presence of hydrogen in combination with one of the two types of cocatalyst systems. The results are shown in Table XV.

TABLE XV

| Run No. | R[1] | R[2] | Cocat[3] | Cat. Mg | Productivity[4] | Total Solubles[4] |
|---|---|---|---|---|---|---|
| 127 | nC$_3$H$_7$ | H | 1 | 6.5 | 23.1 | 29 |
| 128 | nC$_4$H$_9$ | H | 1 | 7.0 | 25.8 | 34 |
| 129 | nC$_3$H$_7$ | CH$_3$ | 1 | 6.3 | 37.9 | 33 |
| 130 | nC$_4$H$_9$ | CH$_3$ | 1 | 6.9 | 12.1 | 24 |
| 131 | nC$_3$H$_7$ | H | 2 | 5.8 | 4.4 | 13 |
| 132 | nC$_4$H$_9$ | H | 2 | 7.3 | 4.1 | 11 |
| 133 | nC$_3$H$_7$ | CH$_3$ | 2 | 8.5 | 5.3 | 7 |
| 134 | nC$_4$H$_9$ | CH$_3$ | 2 | 15.1 | 2.0 | 14 |

[1] The R of Si(OR)$_4$ and Ti(OR)$_4$.

[2] The R of HO— 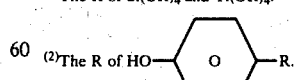 —R.

[3] (1) = 2 mmoles TEA, (2) = 2 mmoles TEA, 1.1 mmoles EA, and 2 mmoles DEAC.
[4] As in Table I.

This data shows that an active polymerization catalyst can be obtained even when part of the Ti(OR)$_4$ is replaced by Si(OR)$_4$. The replacement does, however, result in slightly lower activity as can be seen by comparing Runs 5 and 14 with Runs 127 and 130.

EXAMPLE XVI

In another series of polymerizations, catalyst systems were employed which were individually obtained as in Example I by reacting a mixture containing 0.04 mole of anhydrous magnesium chloride, 0.02 mole of titanium tetra-n-butoxide, 0.01 mole of an aromatic ester and 0.02 mole of a phenol with 0.02 mole of ethylaluminum sesquichloride. Each resulting solid product was isolated by centrifuging, washed with n-hexane to remove contaminants and dried overnight by weathering in the dry box. Each colored solid was then slurried in 25 mL of an equimolar mixture of titanium tetra-chloride and trichlorosilane and heated for one hour at 100° C. From the cooled mixture (23° C.) a colored solid product was isolated by vacuum filtration, washed with n-hexane until the filtrate was colorless and dried as above.

Samples of each catalyst were employed in propylene polymerization as before for one hour at 70° C. in the presence of 10 psi hydrogen and a cocatalyst consisting of a complex of 2 mmoles TEA with 1 mmole EA and 2 mmoles of DEAC. The phenols and esters employed and polymerization results obtained are summarized in Table XVI.

TABLE XVI

| Run No. | Phenol | Catalyst Ester[1] | Produced, g | Employed, mg | Productivity | Total Solubles[2] |
|---|---|---|---|---|---|---|
| 135 | phenol | EB | 4.58 | | 14.8 | 3.9 |
| 136 | phenol | EA | 4.29 | | 5.06 | 2.2 |
| 137 | 4-ethyl- | EB | 5.26 | | 9.79 | 10 |
| 138 | 4-ethyl- | EA | 4.53 | | 3.06 | 15 |
| 139 | 4-sec-butyl- | EB | 4.07 | | 12.9 | 5.1 |
| 140 | 4-sec-butyl- | EA | 4.53 | | 4.39 | 3.0 |
| 141 | 4-phenyl- | EB | 4.79 | | 19.5 | 5.8 |
| 142 | 4-phenyl- | EA | 4.69 | | 7.46 | 2.7 |

[1] EB is ethyl benzoate, EA is ethyl anisate.
[2] As in Table I.

The results indicate that active propylene catalysts are obtained which except for the instances in which 4-ethylphenol is used in catalyst preparation, also display a reduced propensity for soluble polymer formation.

The foregoing examples have been provided solely for the purpose of illustrating embodiments of the invention. Clearly, there are many other embodiments which equitably fall within the scope of the present invention.

What is claimed is:

1. A catalyst for the polymerization of alpha olefins comprising the product resulting when reactants comprising
   (a) a metal dihalide wherein the metal is selected from Groups IIA and IIB of the Periodic Table, and
   (b) a transition metal compound wherein the transition metal is selected from the group consisting of Groups IVB and VB transition metals and the transition metal is bonded to at least one atom selected from the group consisting of oxygen, nitrogen, and sulfur, and said oxygen, nitrogen, and sulfur atoms are in turn bonded to a carbon atom of an organic radical are (1) reacted to produce a first catalyst component, and (2) said first catalyst component is reacted with at least one organoaluminum precipitating agent selected from compounds of the general formula $AlR_nX_{3-n}$ wherein each R is individually selected from saturated and unsaturated hydrocarbyl radicals containing 1 to 20 carbon atoms per radical, X is a halogen, and n is any number such that $1 \leq n \leq 2$, and then (3) the product of that reaction is reacted with at least one halogen-containing compound of Groups IVA and VA capable of adding halogen to the product of step (c).

2. A catalyst according to claim 1 wherein said halogen-containing compound employed in step (3) comprises at least one compound selected from the group consisting of chlorine-containing compounds of Si, Ge, Sn, P, and C.

3. A catalyst according to claim 2 wherein said halogen-containing compound employed in step (3) is selected from the group consisting of organic acid chlorides of the formula R'COCl where R' is an aliphatic or aromatic radical having 1 to 20 carbon atoms; $COCl_2$; $PCl_3$; $SiCl_4$; $SnCl_4$; $CCl_4$; chlorosiloxanes of the formula $Si_nO_{n-1}Cl_{2n+2}$ wherein n is a number in the range of 2 to 7; chlorinated polysilanes having the formula $Si_nCl_{2n+2}$ where n is a number in the range of 2 to 6; chlorinated silanes having the formula $SiH_{4-n}Cl_n$ wherein n is a number in the range of 1 to 3; organosilanes having the formula $R'_nSiH_xCl_y$ wherein R' is an aromatic or aliphatic radical having 1 to 20 carbon atoms, x is a number in the range of 0 to 2, and y is a number in the range of 1 to 3; and alkoxy-halogen silanes having the formula $Si(OR)_{4-n}Cl_n$ wherein R is an alkyl or aryl radical having 1 to 20 carbon atoms and n is a number in the range of 1 to 3.

4. A catalyst according to claim 3 wherein said halogen-containing compound employed in step (3) comprises at least one component selected from $SiCl_4$, $HSiCl_3$ and aromatic organochlorosilanes.

5. A catalyst according to claim 4 wherein $TiCl_4$ is employed in combination with said halogen-containing compound in step 3.

6. A catalyst according to claim 5 wherein a third component is included in the reaction between (a) and (b), said third component being selected from the group consisting of electron donor compounds, substituted and unsubstituted phenols, naphthols, thiophenols, and thionaphthols.

7. A catalyst according to claim 6 wherein said third component is selected from the group consisting of substituted and unsubstituted phenols, thiophenols, naphthols, aralkyl alcohols, benzoic acids, and benzoic acid.

8. A catalyst according to claim 7 wherein said metal halide is $MgCl_2$, said transition metal compound is titanium tetrabutoxide, said third component is a phenol, and said precipitating agent comprises ethylaluminum sesquichloride.

9. A catalyst according to claim 8 wherein said halogen-containing compound is $SiCl_4$ and the molar ratio of $SiCl_4$ to $TiCl_4$ is about 1 to 1.

10. A catalyst according to claim 9 further comprising a cocatalyst comprising triethylaluminum.

11. A catalyst according to claim 10 wherein silicon tetraalkoxide is included in the reaction between (a) and (b).

12. A catalyst according to claim 9 further comprising a cocatalyst comprising triethylaluminum, ethylanisate, diethylaluminum chloride, and diphenylacetylene.

13. A catalyst according to claim 9 further comprising a cocatalyst comprising triethylaluminum, diethylaluminum halide, and at least one electron donor.

14. A catalyst according to claim 3 wherein a third component is included in the reaction between (A) and (B), said third component being selected from at least one of the group consisting of substituted and unsubstituted phenols, thiophenols, naphthols, aralkyl alcohols, benzoic acids, and benzoic acid esters.

15. A catalyst according to claim 14 wherein an electron donor is employed in combination with said halogen-containing compound.

16. A catalyst for the polymerization of alpha olefins comprising the product resulting when reactants comprising
(a) a metal dihalide wherein the metal is selected from Groups IIA and IIB, and
(b) a transition metal compound wherein the transition metal is vanadium bonded to at least one atom selected from the group consisting of oxygen, nitrogen, and sulfur and said oxygen, nitrogen and sulfur atoms are in turn bonded to a carbon atom of an organic radical, and
(c) a third component selected from at least one of the group consisting of electron donors, substituted and unsubstituted phenols, naphthols, thiophenols, thionaphthols, and aralkyl alcohols are reacted to produce a first catalyst component, and said first catalyst component is reacted with an organoaluminum compound precipitating agent selected from compounds of the general formula $AlR_nX_{3-n}$ wherein each R is individually selected from hydrocarbyl radical containing 1 to 20 carbon atoms per radical, X is a halogen, and n is any number such that $1 \leq n \leq 2$, and then the product of that reaction is reacted with at least one halide exchanging source selected from the group consisting of the halides of titanium, vanadium, and zirconium.

17. A catalyst for the polymerization of alpha olefins comprising the product resulting when reactants comprising
(a) a metal dihalide wherein the metal is selected from Groups IIA and IIB, and
(b) a transition metal compound wherein the transition metal is zirconium bonded to at least one atom selected from the group consisting of oxygen, nitrogen and sulfur and said oxygen, nitrogen and sulfur atoms are in turn bonded to a carbon atom of an organic radical, and
(c) a third component selected from at least one of the group consisting of electron donors, substituted and unsubstituted phenols, naphthols, thiophenols, thionaphthols, and aralkyl alcohols are reacted to produce a first catalyst component, and said first catalyst component is reacted with an organoaluminum compound precipitating agent selected from compounds of the general formula $AlR_nX_{3-n}$ wherein each R is individually selected from hydrocarbyl radical containing 1 to 20 carbon atoms per radical, X is a halogen, and n is any number such that $1 \leq n \leq 2$, and then the product of that reaction is reacted with at least one halide exchanging source selected from the group consisting of the halides of vanadium and zirconium.

18. A catalyst for the polymerization of alpha olefins comprising the product resulting when reactants comprising
(a) a metal dihalide wherein the metal is selected from Groups IIA and IIB, and
(b) a transition metal compound wherein the transition metal is titanium bonded to at least one atom selected from the group consisting of oxygen, nitrogen, and sulfur and said oxygen, nitrogen and sulfur and said oxygen, nitrogen and sulfur atoms are in turn bonded to a carbon atom of an organic radical, and
(c) a third component selected from at least one of the group consisting of electron donors, substituted and unsubstituted phenols, naphthols, thiophenols, thionaphthols, and aralkyl alcohols are reacted to produce a first catalyst component, and said first catalyst component is reacted with an organoaluminum compound precipitating agent selected from compounds of the general formula $AlR_nX_{3-n}$ wherein each R is individually selected from hydrocarbyl radical containing 1 to 20 carbon atoms per radical, X is a halogen, and n is any number such that $1 \leq n \leq 2$, and then the product of that reaction is reacted with at least one halide exchanging source selected from the group consisting of the halides of titanium and vanadium.

19. A catalyst according to claim 18 wherein said third component is selected from the group consisting of phenols, thiophenols, naphthols, aralkyl alcohols, benzoic acids, and benzoic acid esters.

20. A catalyst according to claim 19 further comprising a cocatalyst comprising triethylaluminum.

21. A catalyst according to claim 20 wherein said halide exchanging source comprises $TiCl_4$.

22. A catalyst according to claim 21 wherein said third component is selected from at least one compound in the group consisting of phenol, methyl-substituted phenol, p-methoxyphenol, 4-ethylphenol, 3-t-butylphenol, 3-fluorophenol, 4-fluorophenol, thiophenol, 4-sec-butylphenol, p-methoxythiophenol, p-methyl-thiophenol, benzyl alcohol, 4-phenyl-phenol, p-methoxybenzyl alcohol, benzoic acid, m-methoxybenzoic acid, p-methoxybenzoic acid, ethyl benzoate, and ethyl anisate.

23. A catalyst according to claim 22 wherein said metal dihalide is $MgCl_2$ and said transition metal compound is titanium tetra-n-butoxide and said precipitating agent comprises ethylaluminum sesquichloride.

24. A catalyst according to claim 23 further comprising a cocatalyst comprising triethylaluminum, diethylaluminum chloride, and an electron donor.

25. A catalyst according to claim 24 wherein each said electron donor in said cocatalyst is selected from the group consisting of ethyl-anisate, triphenylphosphine oxide, diphenylphosphine, n,n-dimethylformamide, pyrazine, 1,10-phenanthroline, 2,2'-bipyridine, tetramethylpyrazine, diphenylamine, diethylamine, dioctylamine, and ethylene diamine.

26. A catalyst according to claim 24 wherein an additional electron donor is employed in combination with $TiCl_4$ in step (3) and the product from step (3) is further reacted with additional $TiCl_4$.

27. A catalyst according to claim 24 wherein said $TiCl_4$ is employed in combination with a non-halogenated organosilane.

28. A catalyst according to claim 27 wherein said non-halogenated organosilane is selected from diphenylmethylsilane and phenyldimethylsilane.

29. A catalyst according to claim 28 wherein silica tetraalkoxide of the formula $Si(OR)_4$ wherein each R is an alkyl radical having 1 to 4 carbon atoms is included in the reaction between (a) and (b).

30. A catalyst according to claim 8 wherein said halogen containing compound is HSiCl$_3$ and a phenol is employed in the reaction between (a) and (b).

31. A catalyst according to claim 30 wherin in benzoic acid ester is employed in the reaction between (a) and (b).

32. A catalyst according to claim 31 wherein said phenol is 4-phenyl-phenol.

33. A catalyst according to claim 32 wherein said ester is ethyl benzoate and said transition metal compound is titanium tetrabutoxide.

34. A catalyst according to claim 33 further comprising a cocatalyst comprising triethylaluminum, diethylaluminum halide, and at least one electron donor.

35. A catalyst according to claim 34 wherein said cocatalyst consists essentially of triethylaluminum, ethyl anisate, and diethylaluminum chloride.

* * * * *

UNITED STATES PATENT AND TRADEMARK OFFICE
CERTIFICATE OF CORRECTION

PATENT NO. : 4,394,291

DATED : July 19, 1983

INVENTOR(S) : Gil R. Hawley

It is certified that error appears in the above-identified patent and that said Letters Patent is hereby corrected as shown below:

Column 20, line 52 (claim 7), after "acid" insert --- esters ---;
Column 20, line 54 (claim 8), "halide" should read --- dihalide ---;
Column 23, line 6 (claim 31), "wherin in" should read --- wherein a ---.

Signed and Sealed this

Fourteenth Day of August 1984

[SEAL]

Attest:

GERALD J. MOSSINGHOFF

Attesting Officer

Commissioner of Patents and Trademarks